UNITED STATES PATENT OFFICE.

RODERICK H. SMITH, OF DUNKIRK, NEW YORK.

LIQUID PAINT.

SPECIFICATION forming part of Letters Patent No. 286,858, dated October 16, 1883.

Application filed July 2, 1883. (No specimens.)

*To all whom it may concern:*

Be it known that I, RODERICK H. SMITH, a citizen of the United States, residing in Dunkirk, in the county of Chautauqua and State of New York, have invented certain new and useful Improvements in Liquid Paints, of which the following is a specification.

The object of my invention is to produce a mixed paint for general uses having good wearing and lasting qualities and capable of being made cheaply.

My composition consists of the following ingredients, combined in the proportions stated, viz: pure white zinc ground in oil, one hundred pounds; good raw linseed-oil, seven gallons; boiled linseed-oil, seven gallons; acetate-of-lead water, twelve gallons, consisting of acetate of lead three pounds, and water twelve gallons; pure white lead ground in oil, three hundred pounds; turpentine, three gallons; Japan drier, two gallons; rosin-oil, best quality, four gallons. The above ingredients are thoroughly mixed, in the order as above mentioned, in the usual tubs, and are generally put up in sealed cans for the market. These proportions may be varied slightly without materially changing the nature of the compound; but the proportions above given produce a good and durable paint.

I am aware that white lead, rosin-oil, turpentine, linseed-oil, and japan have been combined together in various portions before, and therefore do not claim such, broadly; but What I do claim as my invention is—

An improved liquid paint, consisting of white zinc ground in oil, about equal proportions of raw and boiled linseed-oil, acetate-of-lead water, white lead ground in oil, turpentine, Japan drier, and rosin-oil, in or about the proportions above named.

RODERICK H. SMITH.

Witnesses:
JENNIE M. CALDWELL,
JAMES SANGSTER.